United States Patent
Teyeb et al.

(10) Patent No.: US 10,014,993 B2
(45) Date of Patent: *Jul. 3, 2018

(54) DOWNLINK INTERFERENCE COORDINATION IN A RADIO COMMUNICATION NETWORK

(71) Applicant: Telefonaktiebolaget LM Ericsson (publ), Stockholm (SE)

(72) Inventors: Oumer Teyeb, Solna (SE); Angelo Centonza, Winchester (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 55 days.

This patent is subject to a terminal disclaimer.

(21) Appl. No.: 15/167,059

(22) Filed: May 27, 2016

(65) Prior Publication Data

US 2016/0277163 A1    Sep. 22, 2016

Related U.S. Application Data

(63) Continuation of application No. 13/877,355, filed as application No. PCT/SE2012/051356 on Dec. 7, 2012, now Pat. No. 9,356,709.

(Continued)

(51) Int. Cl.
*H04B 15/00* (2006.01)
*H04L 5/00* (2006.01)
(Continued)

(52) U.S. Cl.
CPC .......... *H04L 5/0032* (2013.01); *H04B 15/02* (2013.01); *H04W 52/143* (2013.01);
(Continued)

(58) Field of Classification Search
None
See application file for complete search history.

(56) References Cited

U.S. PATENT DOCUMENTS

2010/0267408 A1    10/2010    Lee et al.
2011/0003598 A1     1/2011    Ma et al.
(Continued)

FOREIGN PATENT DOCUMENTS

| JP | 2011049744 A | 3/2011 |
|---|---|---|
| JP | 2013533709 A | 8/2013 |

(Continued)

OTHER PUBLICATIONS

Ericsson et al., "Signalling support for reduced non-zero power ABS", 3GPP TSG-RAN WG1 #68, Feb. 6-10, 2012, pp. 1-4, Dresden, Germany, R1-120804.

(Continued)

*Primary Examiner* — Mohammed Rachedine
(74) *Attorney, Agent, or Firm* — Coats & Bennett, PLLC

(57) ABSTRACT

An aggressor base station herein performs downlink interference coordination with one or more victim base stations in a radio communication network. Such coordination is performed for each of one or more iterations. For any given iteration, the aggressor sends a message to a victim that indicates, for each of one or more downlink resources, whether the aggressor promises to protect that resource from interference by not transmitting on the resource with a transmit power above a threshold ($TH_2$). The victim schedules downlink transmissions to one or more user equipments on resources that, according to the message, are protected from interference. Based on monitoring for interference to those transmissions, though, the victim generates and sends to the aggressor feedback that generally requests an increase or decrease of the threshold ($TH_2$). From evaluation of this feedback, the aggressor determines a new threshold ($TH_2$) on which promises are to be based in a message to the victim in a subsequent iteration.

22 Claims, 11 Drawing Sheets

Related U.S. Application Data

(60) Provisional application No. 61/611,080, filed on Mar. 15, 2012.

(51) Int. Cl.

| | | |
|---|---|---|
| *H04W 72/04* | (2009.01) | |
| *H04W 72/08* | (2009.01) | |
| *H04W 52/14* | (2009.01) | |
| *H04W 52/24* | (2009.01) | |
| *H04W 52/36* | (2009.01) | |
| *H04B 15/02* | (2006.01) | |
| *H04W 92/20* | (2009.01) | |
| *H04W 52/34* | (2009.01) | |
| *H04W 52/60* | (2009.01) | |

(52) U.S. Cl.
CPC ....... *H04W 52/244* (2013.01); *H04W 52/247* (2013.01); *H04W 52/367* (2013.01); *H04W 72/0426* (2013.01); *H04W 72/082* (2013.01); *H04W 52/343* (2013.01); *H04W 52/60* (2013.01); *H04W 92/20* (2013.01)

(56) References Cited

U.S. PATENT DOCUMENTS

| | | |
|---|---|---|
| 2011/0053589 A1 | 3/2011 | Kimura et al. |
| 2011/0183679 A1* | 7/2011 | Moon ................. H04W 72/082 455/450 |
| 2011/0310830 A1 | 12/2011 | Wu et al. |
| 2012/0014333 A1* | 1/2012 | Ji .......................... H04L 5/0032 370/329 |
| 2013/0028158 A1* | 1/2013 | Lee ................... H04W 52/0206 370/311 |
| 2013/0163570 A1 | 6/2013 | Zhang et al. |

FOREIGN PATENT DOCUMENTS

| | | |
|---|---|---|
| WO | 2011047348 A1 | 4/2011 |
| WO | 2011088465 A1 | 7/2011 |

OTHER PUBLICATIONS

Ericsson, "DL Interference enhancements for Carrier-based HetNet ICIC", 3GPP TSG-RAN WG3 #75bis, Mar. 26-30, 2012, pp. 1-3, Cabo San Luca, Mexico, R3-120728.

QUALCOMM Incorporated, et al., "Carrier-based HetNet ICIC: solution description for the DL scenario", 3GPP TSG-RAN WG3 #75, Feb. 6-10, 2012, pp. 1-3, Dresden, Germany, R3-120410.

Alcatel-Lucent, et al., "Simultaneous use of RNTP and ABS for R10 inter-cell interference coordination.", 3GPP TSG RAN WG3 Meeting #70bis, Jan. 17-21, 2011, pp. 1-5, Dublin, Ireland, R3-110254.

QUALCOMM Incorporated, "Carrier-based HetNet ICIC DL Interference scenario: solutions", 3GPP TSG-RAN WG3 #75, Feb. 6-10, 2012, pp. 1-4, Dresden, Germany, R3-120302.

3rd Generation Partnership Project, "Technical Specification Group Radio Access Network; Evolved Universal Terrestrial Radio Access Network (E-UTRAN); X2 application protocol (X2AP) (Release 10)", 3GPP TS 36.423 V10.3.0, Sep. 2011, pp. 1-132.

3rd Generation Partnership Project, "Technical Specification Group Radio Access Network; Evolved Universal Terrestrial Radio Access (E-UTRA); Physical Channels and Modulation (Release 10)", 3GPP TS 35.211 V10.4.0, Dec. 2011, pp. 1-101.

Alcatel-Lucent Shanghai Bell, et al., "Further Discussion on ABS Status Resource Report for eICIC," 3GPP TSG-RAN WG3 #73, Aug. 22-26, 2011, pp. 1-3, Athens, Greece, R3-112162.

CATT, "Discussion on the Design of ABS Pattern and its Impact on the Measurement," 3GPP TSG RAN WG1 meeting #63, Nov. 15-19, 2010, pp. 1-4, Jacksonville, USA, R1-105935.

QUALCOMM Incorporated, "Carrier-based HetNet ICIC use cases and solutions," 3GPP TSG-RAN WG3 #73bis, Oct. 10-14, 2011, pp. 1-5, Zhuhai, China, R3-112609.

CMCC, "Some considerations on eICIC," 3GPP TSG-RAN WG3 Meeting #70, Nov. 15-19, 2010, pp. 1-3, Jacksonville, USA, R3-103391.

López-Pérez, D. et al., "Enhanced Intercell Interference Coordination Challenges in Heterogeneous Networks," IEEE Wireless Communications, Jun. 2011, pp. 22-30.

\* cited by examiner

DOWNLINK INTERFERENCE COORDINATION IN A RADIO COMMUNICATION NETWORK

RELATED APPLICATIONS

The present application is a continuation of U.S. patent application Ser. No. 13/877,355, which was filed on May 24, 2013, which is a national stage application of PCT/SE2012/051356, filed Dec. 7, 2012, and claims benefit of U.S. Provisional Application 61/611,080, filed Mar. 15, 2012, the disclosures of each of which are incorporated herein by reference in their entirety.

TECHNICAL FIELD

The present invention relates to downlink interference coordination in a radio communication network.

BACKGROUND

The phenomenal growth in the demand for radio communications has put persistent pressure on radio communication network operators to improve the capacity of their networks. To improve the efficiency of these networks, scarce radio resources have to be reused aggressively in neighboring cells. As a result, inter-cell interference has become a main source of signal disturbance, limiting not only the service quality to user equipments (UEs) at the cell edges, but also the overall system throughput.

Inter-cell Interference Coordination (ICIC) is one technique for mitigating downlink inter-cell interference. According to ICIC, base stations communicate scheduling and/or interference information amongst themselves. An "aggressor" base station that generally contributes to interference at user equipments (UEs) served by a "victim" base station, for instance, sends information to the victim base station describing the radio resources on which the aggressor base station will cause interference. This way, the victim base station can intelligently schedule downlink transmissions to user equipments (UEs) so as to avoid that interference.

Consider, for example, a radio communication network based on Long Term Evolution (LTE) standards that employs ICIC. An aggressor base station (i.e., eNodeB) sends a LOAD INFORMATION message over a logical X2 interface to a victim base station. A LOAD INFORMATION message in this regard includes a so-called Relative Narrowband Transmit Power (RNTP) information element. The RNTP information element includes an RNTP bitmap. Each bit of the RNTP bitmap corresponds to a respective downlink resource, defined as a physical resource block in LTE (i.e., one 0.5 ms slot in the time domain and 12 contiguous subcarriers in the frequency domain). The value of a given bit indicates whether the aggressor base station promises to protect the corresponding downlink resource from interference by not transmitting on that resource with a transmit power higher than a certain threshold. This threshold is appropriately called the RNTP threshold and is also included in the message. Based on the RNTP bitmap, the victim base station may avoid scheduling downlink transmissions to UEs (at least UEs subject to high interference, such as those at the cell edge) on certain downlink resources; namely, those on which the aggressor base station may transmit with a power higher than the RNTP threshold.

Potential values of the RNTP threshold include $-\infty$, $-11$, $-10$, $-9$, $-8$, $-7$, $-6$, $-5$, $-4$, $-3$, $-2$, $-1$, $0$, $+1$, $+2$, and $+3$ dB.

For example, if the aggressor base station sets the RNTP threshold to be $-\infty$, the aggressor base station promises that it won't transmit any data on downlink resources that correspond to bits in the RNTP bitmap with a value of "0." Alternatively, if the aggressor base station sets the RNTP threshold to be 0 dB, the aggressor base station promises that it will transmit less than maximum power on downlink resources that correspond to bits in the RNTP bitmap with a value of "0." As yet another example, if the aggressor base station sets the RNTP threshold to be +3, the aggressor base station indicates that it will use power boosting up to 50% higher than maximum power on downlink resources corresponding to bits in the RNTP bitmap with a value of "1." Regardless of the indication by the aggressor base station, the victim base station assumes the indication remains the same until it receives a subsequent RNTP bitmap in the future.

One non-limiting context in which downlink interference coordination proves especially effective is in a radio communication network that employs low power base stations, such as pico base stations, home base stations, relays, etc. These low power base stations are strategically deployed alongside high power (i.e., macro) base stations to add additional capacity to areas of high traffic and/or to improve the coverage of areas with otherwise bad coverage. The radio network is thus appropriately referred to as a heterogeneous or multilayer network. In this setting, the macro base stations appear as aggressor base stations to the low power base stations. But, with the macro base stations sending scheduling and/or interference information to the low power base stations, as described above, the low power base stations are able to intelligently schedule downlink transmissions so as to avoid macro interference.

Although downlink interference coordination proves largely effective in this and other contexts, such coordination still has limitations.

SUMMARY

An aggressor base station herein advantageously performs downlink interference coordination with one or more victim base stations based on feedback received from those victim base stations. In at least some embodiments, this means that downlink interference coordination will actually account for the potentially different degrees to which the aggressor-imposed interference affects the UEs served by those different victim base stations.

More particularly, embodiments herein include a method performed by an aggressor base station for downlink interference coordination with one or more victim base stations in a radio communication network. The method is performed for each of one or more iterations. For any given iteration, the method includes sending a message to a victim base station that indicates, for each of one or more downlink resources, whether the aggressor base station promises to protect that resource from interference by not transmitting on the resource with a transmit power above a threshold. The method also entails receiving feedback from the victim base station generally requesting an increase or decrease of the threshold. From an evaluation of that feedback, the method includes determining a new threshold on which promises are to be based in a message to the victim base station in a subsequent iteration.

Embodiments also include a corresponding method performed by a victim base station. The method is likewise performed for each of one or more iterations. For any given iteration, the method includes receiving a message from the aggressor base station that indicates, for each of one or more downlink resources, whether the aggressor base station promises to protect that resource from interference by not transmitting on the resource with a transmit power higher than a threshold. The method further includes scheduling downlink transmissions to one or more UEs on downlink resources that, according to the message, are protected from interference. The method also entails monitoring for interference to the scheduled downlink transmissions, and, based on that monitoring, generating feedback that generally requests an increase or decrease of the threshold. Finally, the method includes sending this feedback to the aggressor base station.

As used herein, the feedback just generally requests an increase or decrease of the threshold in the sense that the feedback does not specifically request that the threshold be increased or decreased to a specific value. Nor does the feedback specifically request that the threshold be increased or decreased by a specific amount (so as to effectively request that the threshold be increased or decreased to a specific value). In some embodiments, for example, the feedback simply comprises a single bit flag whose two different values generally indicate whether an increase or a decrease is requested.

Regardless, in some embodiments, the aggressor base station is configured to adjust the number of downlink resources that the aggressor base station promises to protect across two or more different iterations. The aggressor base station does so by maintaining, across those different iterations, the transmit power with which the aggressor base station transmits on each of the one or more downlink resources. In other embodiments, by contrast, the aggressor base station is configured to adjust, across two or more different iterations, the transmit power with which the aggressor base station transmits on one or more of the downlink resources, based on an evaluation of the feedback.

Irrespective of whether or not the aggressor base station adjusts its transmit power in conjunction with determining the new threshold, downlink interference coordination is extended in at least some embodiments to account for multiple different victim base stations. Such proves advantageous, for instance, when the different victims are located at different distances from the aggressor or are otherwise affected by the aggressor-imposed interference to different degrees.

In some embodiments, for example, the aggressor base station is configured to send the message to one or more different victim base stations also, and to receive feedback from each of the one or more different victim base stations that generally requests an increase or decrease of the threshold. The aggressor base station in this case determines the new threshold based on an evaluation of the feedback received from the victim base station as well as the one or more different victim base stations.

In other embodiment, though, the aggressor base station is configured to send a different message to a different victim base station that indicates, for each of one or more downlink resources, whether the aggressor base station promises to protect that resource from interference by not transmitting on the resource with a transmit power above a different threshold. The aggressor receives feedback from the different victim base station that generally requests an increase or decrease of the different threshold. From an evaluation of this feedback, the aggressor determines a different new threshold on which promises are to be based in a different message to the different victim base station in a subsequent iteration.

In at least some embodiments, the victim is configured to generate the feedback by determining a number or percentage of UEs (to which downlink transmissions have been scheduled on protected resources) that are experiencing interference above a defined high interference level. If this number or percentage is above a first defined level, the victim generates the feedback to generally request a decrease of the threshold. If the number or percentage is below a second defined level, the victim generates the feedback to generally request an increase of the threshold. Moreover, in one or more embodiments, the victim is configured to send the feedback more frequently the higher the number or percentage is above the first defined level or the lower the number or percentage is below the second defined level.

In some of these embodiments, the victim is further configured to generate the feedback to indicate the number or percentage of the UEs that are experiencing interference above a defined high interference level. As part of the feedback, the aggressor is configured to determine the new threshold based on this number or percentage.

Embodiments herein are further applicable to networks that employ different types of subframes, e.g., normal subframes, ABSs, RPSFs, etc. One such network, for instance, is a heterogeneous network that employs cell range extension (CRE). Regardless of the particular type of network, though, the steps of the methods discussed above are performed for each of one or more of the different types of sub-frames, e.g., such that one or more instances of the methods are performed. Moreover, the message sent by the aggressor and the feedback sent by the victim each indicate for which type of sub-frame the message/feedback is relevant. This means that different thresholds are determined for different types of sub-frames.

In some embodiments, as just described, the sub-frame type differentiation is implemented together with the aforementioned threshold negotiation. In other embodiments, though, subframe type differentiation is implemented independently from the aforementioned threshold negotiation.

In this case, embodiments herein include a different method implemented by an aggressor base station. The method's steps are performed for each of one or more different types of sub-frames. Processing for a given type of sub-frame includes sending a message to a victim base station that indicates, for each of one or more downlink resources, whether the aggressor base station promises to protect that resource from interference by not transmitting on the resource with a transmit power above a threshold. Processing also notably entails sending information to the victim base station indicating for which type of sub-frame the message is relevant. In some embodiments, for example, this information is included in the message.

In some embodiments, the radio communication network is an LTE network. In this case, a downlink resource comprises a resource block (RB), the message comprises a Relative Narrowband Transmit Power (RNTP) message that indicates an RNTP bitmap, and the feedback from a victim base station includes a flag for requesting an increase or decrease to the threshold.

Embodiments herein also include a base station configured to perform any of the processing described, as well as a corresponding computer program product.

DETAILED DESCRIPTION

Figure 1:
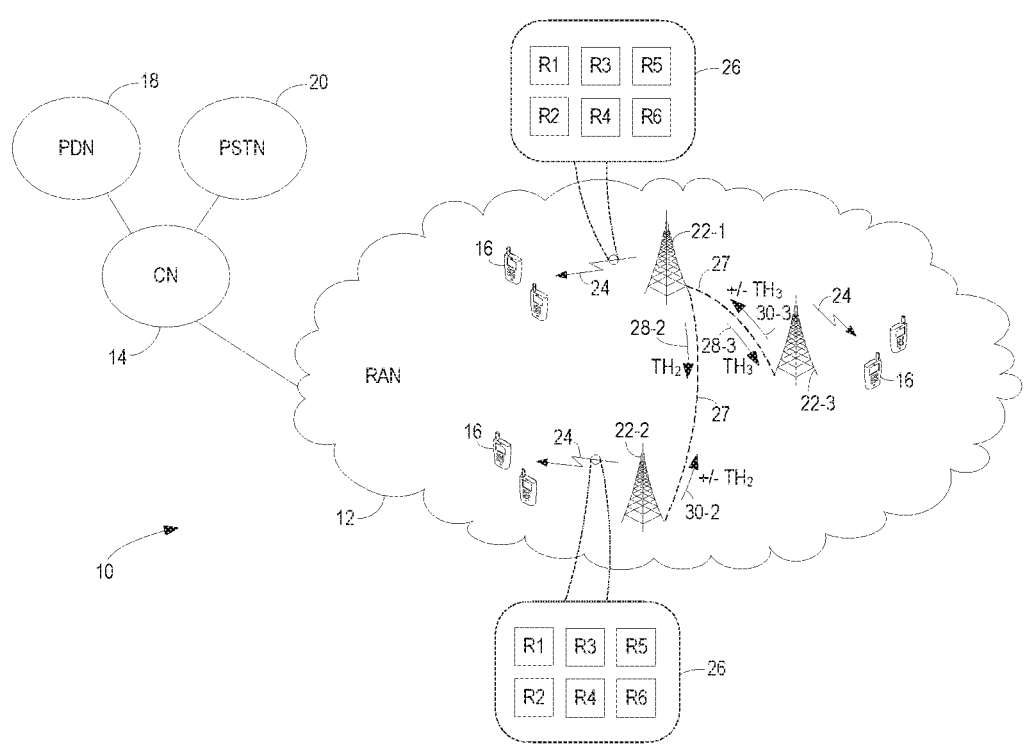
FIG. 1 is a block diagram of a radio communication network that includes base stations configured according to one or more embodiments.

FIG. 1 depicts a radio communication network 10 according to one or more embodiments. The network 10 as shown includes a radio access network (RAN) 12 and a core network (CN) 14. The RAN 12 provides user equipments (UEs) 16 with access to the CN 14 over radio resources. The CN 14 correspondingly connects the RAN 12 to one or more external networks, such as a packet data network (PDN) 18 and/or a Public Switched Telephone Network (PSTN) 20.

The RAN 12 more specifically includes a plurality of base stations 22-1, 22-2, 22-3, . . . 22-N (generally referred to as base stations 22) that each include radio circuitry configured to provide radio coverage for one or more geographic areas referred to as cells. Providing radio coverage in this regard entails a given base station 22-n scheduling downlink transmissions 24 to one or more UEs 16 located within the cells covered by that base station 22-n. The base station 22-n schedules such downlink transmissions 24 to occur over radio resources allocated for the downlink, referred to as downlink resources 26. Shown very generally in FIG. 1 as simply resources R1-R6, these downlink resources 26 comprise resources in time, frequency, code, and/or space over which downlink transmissions are scheduled. In embodiments where the network 10 conforms to Long Term Evolution (LTE) standards, for example, resources 26 correspond to physical resource blocks (where a given physical resource block is one 0.5 ms slot in the time domain and 12 contiguous subcarriers in the frequency domain).

To improve resource efficiency, the downlink resources 26 are reused by neighboring base stations 22-n. As a result, when one base station 22 schedules downlink transmissions 24 to occur over certain downlink resources 26, those transmissions 24 threaten UEs 16 served by a neighboring base station 22 with interference on those downlink resources 26. The base station 22 contributing this interference is referred to as the "aggressor" base station or simply the "aggressor," with base station 22-1 being using as an example herein. Conversely, the base station 22 serving UEs 16 affected by the interference is referred to herein as the "victim" base station or simply the "victim," with base stations 22-2 and 22-3 being used as examples.

To mitigate this interference, the aggressor base station 22-1 performs downlink interference coordination with one or more of the victim base stations 22-2, 22-3. As part of this coordination, the aggressor base station 22-1 sends load information to the victim base station(s) 22-2, 22-3, e.g., over inter-base station interfaces 27. Based on this load information, the victim base station(s) 22-2, 22-3 can intelligently schedule their downlink transmissions 24 in such a way that avoids the aggressor-imposed interference. Notably, the aggressor base station 22-1 according to one or more embodiments herein performs downlink interference coordination based on feedback received from the victim base station(s) 22-2, 22-3. In at least some embodiments, this means that the load information sent to the victim base station(s) 22-2, 22-3 will actually account for the potentially different degrees to which the aggressor-imposed interference affects the UEs 16 served by those different victim base stations 22-2, 22-3.

Figure 2:
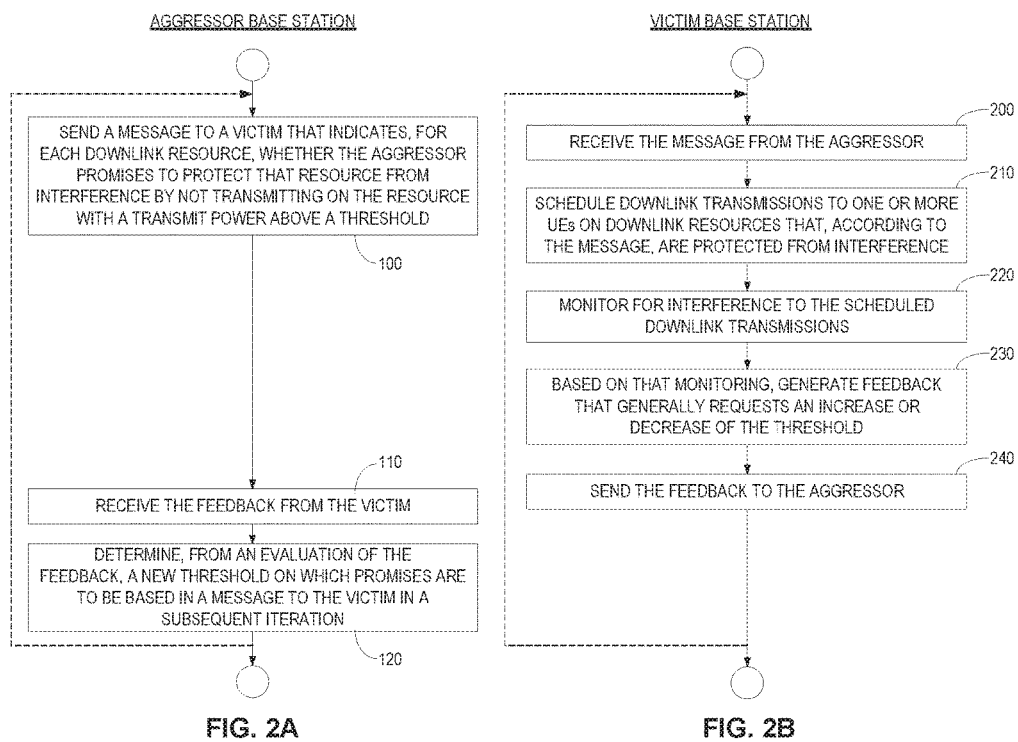
FIG. 2A is a logic flow diagram of processing performed by an aggressor base station according to one or more embodiments.
FIG. 2B is a logic flow diagram of processing performed by a victim base station according to one or more embodiments.

FIGS. 2A and 2B respectively illustrate processing performed by the aggressor base station 22-1 and one of the victim base stations 22-2 according to one embodiment. As shown in FIG. 2A, in conjunction with FIG. 1, processing for downlink interference coordination is performed by the aggressor base station 22-1 over one or more iterations. For each of the one or more iterations, processing entails sending a message 28-2 to the victim base station 22-2 (Block 100). This message 28-2 indicates, for each of one or more downlink resources 26, whether the aggressor base station 22-1 promises to protect that resource 26 from interference by not transmitting on the resource 26 with a transmit power above a threshold $TH_2$.

FIG. 2B shows that processing at the victim base station 22-2 is likewise performed over one or more corresponding iterations. For each iteration, processing includes receiving the message 28-2 from the aggressor base station 22-1 (Block 200). Processing further includes scheduling downlink transmissions 24 to one or more UEs 16 on downlink resources 26 that, according to the message 28-2, are protected from interference (Block 210). In some embodiments, such scheduling is selectively performed for those UEs 16 subject to interference, e.g., UEs 16 at the edge of one or more cells served by the victim base station 22-2.

Regardless, processing at the victim base station 22-2 further involves monitoring for interference to the scheduled downlink transmissions 24 (Block 220). Based on this monitoring, processing notably entails generating feedback 30-2 that generally requests an increase (+) or decrease (−) of the threshold $TH_2$ (Block 230). In one embodiment, for example, generating such feedback 30-2 involves requesting a decrease of the threshold $TH_2$ if monitoring indicates interference to the scheduled transmissions 24 is above a defined threshold (despite the aggressor base station 22-1 promising to protect those transmissions 24 from interference). Conversely, an increase of the threshold $TH_2$ is requested if monitoring indicates interference to the scheduled transmissions 24 is below the same or a different defined threshold.

As used herein, the feedback 30-2 just generally requests an increase or decrease of the threshold $TH_2$ in the sense that the feedback 30-2 does not specifically request that the threshold $TH_2$ be increased or decreased to a specific value. Nor does the feedback 30-2 specifically request that the threshold $TH_2$ be increased or decreased by a specific amount (so as to effectively request that the threshold $TH_2$ be increased or decreased to a specific value). In some embodiments, for example, the feedback 30-2 simply comprises a single bit flag whose two different values generally indicate whether an increase or a decrease is requested. Irrespective of the particular implementation of the feedback 30-2, though, processing at the victim base station 22-2 then includes sending the feedback 30-2 to the aggressor base station 22-1 (Block 240).

Returning back to FIG. 2A, processing at the aggressor base station 22-1 correspondingly continues with receiving the feedback 30-2 from the victim base station 22-2 (Block 110). From an evaluation of this feedback 30-2, processing then entails determining a new threshold $TH_2$ on which promises are to be based in a message 28-2 to the victim base station 22-2 in a subsequent iteration (Block 120). That is, any message 28-2 sent to the victim base station 22-2 in such a subsequent iteration will indicate, for each of the one or more downlink resources 26, whether the aggressor base station 22-1 promises to protect that resource 26 from interference by not transmitting on the resource with a transmit power above the new threshold $TH_2$. In one or more embodiments, for instance, this involves picking the new threshold $TH_2$ from a set of possible thresholds. Regardless, with the new threshold $TH_2$ determined in this way, the threshold $TH_2$ advantageously accounts for the degree to which the aggressor-imposed interference actually affects the UEs 16 served by the victim base station 22-2, i.e., the threshold is as relevant as possible.

In some embodiments, for example, the aggressor base station 22-1 determines a new threshold $TH_2$ for a subsequent iteration that is decreased relative to the threshold $TH_2$ from a previous iteration, responsive to receiving feedback 30-2 that requests such a decrease. Moreover, the aggressor base station 22-1 does so in these embodiments while maintaining, across iterations, the transmit power with which it transmits on each of the downlink resources 26. This means that, in the subsequent iteration, the aggressor base station 22-1 promises the victim base station 22-2 that it will protect fewer downlink resources 26 from interference, in order to give the victim base station 22-2 a more accurate indication of which resources 26 will actually be protected from interference. Conversely, the aggressor base station 22-1 may promise to protect more resources 26 upon determining a new threshold $TH_2$ that is increased. Thus, as generally indicated by this example, the aggressor base station 22-1 adjusts the number of downlink resources 26 that it promises to protect across two or more different iterations, by maintaining, across those different iterations, the transmit power with which the aggressor base station 22-1 transmits on each of the resources 26.

In other embodiments, by contrast, the aggressor base station 22-1 adjusts, across two or more different iterations, the transmit power with which it transmits on one or more of the resources 26, based on an evaluation of the feedback 30-2. In one embodiment, for instance, the transmit power is adjusted in such a way that the aggressor base station 22-1 promises to protect substantially the same number of resources 26 across those different iterations. Using the same example as just described, the aggressor base station 22-1 in these embodiments may reduce the transmit power with which it transmits on one or more of the downlink resources 26 in conjunction with determining a new threshold $TH_2$ that is decreased. In doing so, the aggressor base station 22-1 promises to protect the same resources 26 as before, but provides better protection of those resources 26 in view of the feedback 30-2 indicating how the aggressor-imposed interference is actually affecting the victim base station 22-2.

In another embodiment, though the transmit power is adjusted in such a way that the aggressor base station 22-1 promises to protect more or less resources 26 across the different iterations. As one example, the aggressor base station 22-1 may decide to reschedule its UEs 16 in order to protect a higher or lower number of downlink resources 26, i.e., in order to achieve a higher or lower number of resources 26 with transmit power lower than the new threshold $TH_2$.

Regardless of whether or not the aggressor base station 22-1 adjusts its transmit power in conjunction with determining the new threshold, the processing shown in FIGS. 2A and 2B is extended in at least some embodiments to account for multiple different victims, such as victims 22-2 and 22-3. Such proves advantageous, for instance, when the different victims 22-2, 22-3 are located at different distances from the aggressor 22-1 or are otherwise affected by the aggressor-imposed interference to different degrees. In any event, as shown in FIG. 1, the aggressor 22-1 in these embodiments also sends a message 28-3 to the other depicted victim 22-3. This message 28-3 similarly indicates, for each of one or more downlink resources 26, whether the aggressor 22-1 promises to protect that resource 26 from interference by not transmitting on the resource 26 with a transmit power above a threshold $TH_3$. Upon scheduling downlink transmissions 24 according to the message 28-3 and monitoring for interference to those transmissions 24, the victim 22-3 sends feedback 30-3 generally requesting an increase or decrease of the threshold $TH_3$. Based on this feedback 30-3, the aggressor 22-1 determines a new threshold $TH_3$ for sending a message 28-3 in a subsequent iteration.

In one or more embodiments, the message 28-3 that the aggressor 22-1 sends to victim 22-3 is the same as the message 28-2 that the aggressor 22-1 sends to victim 22-2, meaning that the thresholds $TH_2$ and $TH_3$ are the same for the victims 22-2, 22-3. For these embodiments, therefore, the messages 28-2 and 28-3 will be referred to as message 28 and the thresholds $TH_2$ and $TH_3$ will be referred to as threshold TH. That said, the aggressor 22-1 may still receive different feedback 30-2, 30-3 from different victims 22-2, 22-3 since, for instance, the victims may be affected by interference to different degrees. Thus, for any given iteration, the aggressor 22-1 determines a new threshold TH for sending a message 28 to all victims 22-2, 22-3 in a subsequent iteration based on an evaluation of all of the feedback 30-2, 30-3 from the victims 22-2, 22-3.

In one embodiment, for example, the aggressor 22-1 determines whether the new threshold TH is to be increased or decreased (relative to the threshold TH used in the previous iteration) based on whether most of the victims 22-2, 22-3 requested an increase or decrease. In this way, the aggressor 22-1 compares the feedback 30-2, 30-3 from the victims and determines a new threshold TH that is suitable to most.

In some of these embodiments, the aggressor 22-1 reacts immediately to feedback from any victim by determining a new threshold TH and sending the message 28 to all victims. In other embodiments, though, the aggressor 22-1 waits until a certain (configurable) time duration has elapsed since sending out of the last message 28 to the victims 22-2, 22-3. When this time has elapsed, the aggressor 22-1 evaluates the most recently received feedback from the victims 22-2, 22-3 in order to determine the new threshold TH and sends the message 28 to the victims.

In other embodiments, the message 28-3 that the aggressor 22-1 sends to victim 22-3 is only the same as the message 28-2 that the aggressor 22-1 sends to victim 22-2 for an initial iteration. This means that the thresholds $TH_2$ and $TH_3$ are initially the same for all victims 22-2, 22-3, e.g., $TH_2 = TH_3 = TH_{default}$, a default threshold. But, the thresholds $TH_2$ and $TH_3$ diverge in subsequent iterations to the extent that different victims 22-2, 22-3 provide the aggressor 22-1 with different feedback 30-2, 30-3. That is, based on different feedback 30-2, 30-3 from different victims 22-2, 22-3, the aggressor 22-2 tailors or otherwise determines different new thresholds $TH_2$, $TH_3$ for the different victims 22-2, 22-3. Given different thresholds $TH_2$ and $TH_3$, the aggressor 22-1 may make different promises to the different victims 22-2, 22-3 that are tailored to the different degrees to which the aggressor-imposed interference affects the UEs 16 served by those different victims 22-2, 22-3. Thus, different messages 28-2, 28-3 sent to the different victims 22-2, 22-3 may indicate that the aggressor 22-1 promises to protect different downlink resources 26.

As one example, the aggressor 22-1 sends an initial message 28 to all victims that indicates, for each of one or more downlink resources 26, whether the aggressor 22-1 promises to protect that resource 26 from interference by not transmitting on the resource 26 with a transmit power above a default threshold $TH_{default}$, e.g., −5 db. Within a certain (configurable) duration, the aggressor 22-1 receives feedback from three victims requesting an increase of the threshold and receives feedback from two victims requesting a decrease of the threshold. In this case, the aggressor 22-1 determines a new, higher threshold for sending in a subsequent iteration a message to the three victims that requested an increase. The aggressor 22-1 also determines a new, lower threshold for sending in the subsequent iteration a message to the two victims that requested a decrease. In this way, the aggressor 22-1 creates different messages with different thresholds for different subgroups of victims.

In yet other embodiments, the message 28-3 that the aggressor 22-1 sends to victim 22-3 is not the same as the message 28-2 that the aggressor 22-1 sends to victim 22-2, even initially. In these embodiments, the aggressor 22-1 immediately starts out with different thresholds $TH_2$, $TH_3$ for different victims 22-2, 22-3, e.g., based on known information that directly or indirectly indicates appropriate initial thresholds for the victims. The aggressor 22-1 in one embodiment, for instance, learns appropriate initial thresholds for the victims from previous interaction or threshold negotiation with those victims. For example, where downlink interference coordination is stopped and resumed later (e.g., for power saving reasons), the aggressor 22-1 resumes coordination by using as initial thresholds the thresholds that were last determined before coordination was stopped. In other embodiments, the aggressor 22-1 deduces the appropriate initial thresholds based on information about the location of the victims, e.g., relative to the aggressor 22-1.

Figure 3:
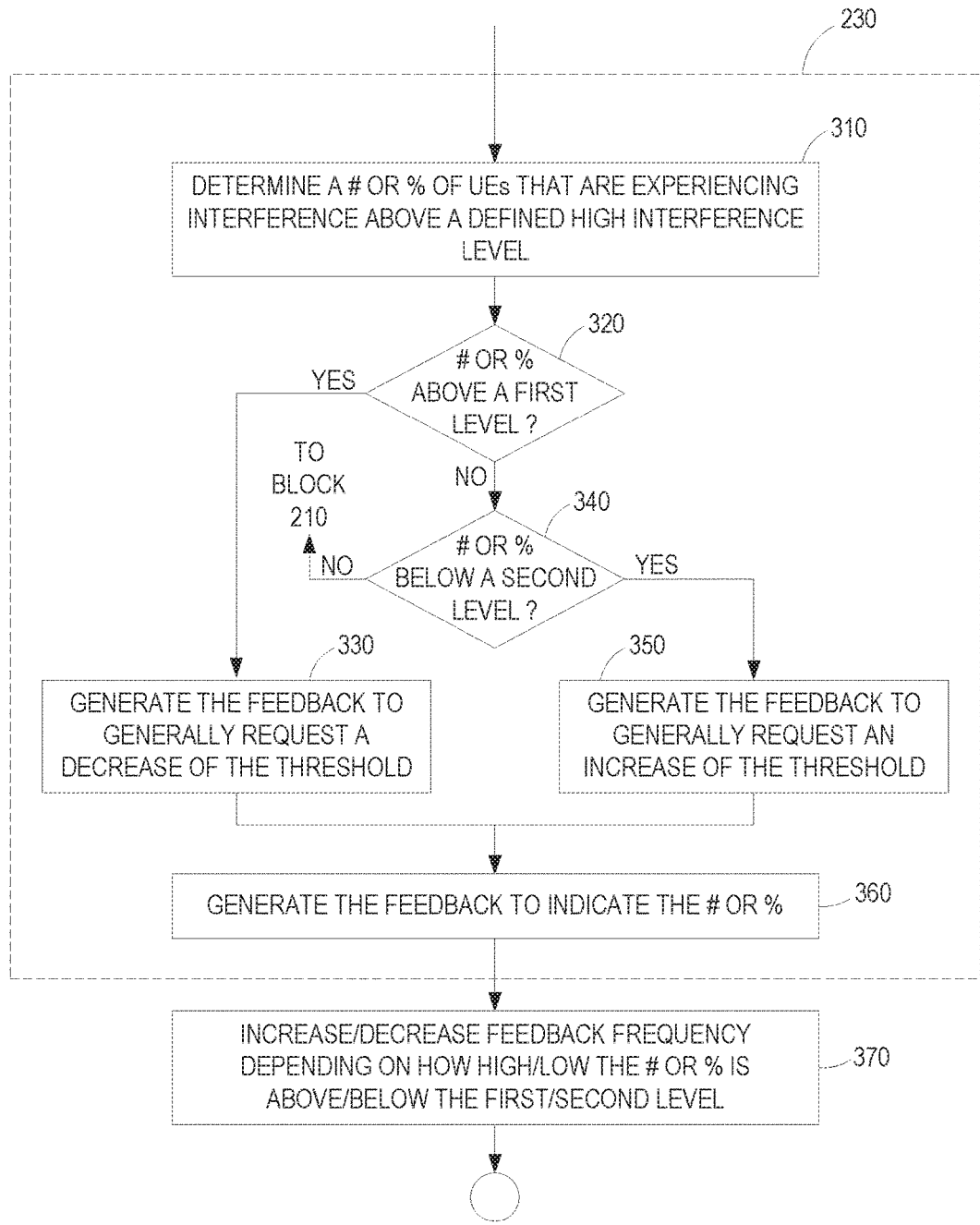
FIG. 3 is a logic flow diagram of processing performed by a victim base station for generating feedback according to one or more embodiments.

Irrespective of whether the processing shown in FIGS. 2A and 2B is extended to account for multiple different victims, FIG. 3 illustrates additional details of the processing performed in Block 230 by the victim 22-2 for generating the feedback 30-2 according to one or more embodiments. As shown in FIG. 3, feedback generation (Block 230) at the victim 22-2 entails determining a number or percentage (e.g, % HI) of UEs 16 (to which downlink transmissions 24 have been scheduled on protected resources 26) that are experiencing interference above a defined high interference level (Block 310). That is, the victim 22-2 collects statistics on the experienced downlink interference of those UEs 16. In any event, feedback generation entails determining whether this number or percentage of UEs 16 is above a first defined level (e.g., Level_High) (Block 320). If so, then the threshold $TH_2$ was higher than the relevant value for the victim 22-2, because the victim's UEs 16 experienced high interference even though the aggressor 22-1 indicated the resources 26 used for the UEs 16 were protected from interference. Accordingly, upon determining YES at Block 320, the feedback 30-2 is generated to generally request a decrease of the threshold $TH_2$ (Block 330).

In at least some embodiments, the victim 22-2 keeps sending the feedback 30-2 until the number or percentage of UEs 16 falls below a certain (configurable) threshold (Level_normal).

Feedback generation also entails determining if the number or percentage of UEs 16 is below a second defined level (e.g., Level_Low) (Block 340). If so, then the threshold $TH_2$ was lower than the relevant value for the victim 22-2. According, upon determining YES at Block 340, the feedback 30-2 is generated to generally request an increase of the threshold $TH_2$ (Block 350).

In at least some embodiments, feedback generation further entails generating the feedback 30-2 to actually indicate the number or percentage (% HI) of UEs 16 that are experiencing interference above the defined high interference level (Block 360). In this case, the aggressor 22-1 bases determination of the new threshold $TH_2$ on this number or percentage. In one embodiment, for example, the higher the number or percentage, the lower the aggressor 22-1 determines the new threshold $TH_2$ to be. Conversely, the lower the number or percentage, the higher the aggressor 22-1 determines the new threshold $TH_2$ to be.

Alternatively or additionally, the victim 22-2 in one or more embodiments adjusts the frequency with which it sends the generated feedback 30-2 as a function of the number or percentage. Specifically, the victim 22-2 sends the feedback 30-2 more frequently the higher the number or percentage is above the first defined level (e.g., Level_High) or the lower the number or percentage of the UEs is below the second defined level (e.g., Level_Low) (Block 370). Thus, the higher the number or percentage is above the first defined level, the more frequenct the requested decrement of the threshold $TH_2$, while the lower the number or percentage is below the second defined level, the more frequent the requested increment of the threshold $TH_2$.

Irrespective of the different variations and modifications described above, those skilled in the art will appreciate certain advantages of embodiments herein. First, the adaptive approach to informing victims about downlink interference protected resources does not impact the UEs. Indeed, embodiments herein are based on peer to peer signaling and base station internal evaluation of the applicable enhancements. This leaves fully autonomy to the base station to decide the best scheduling strategy for its UEs.

Second, the embodiments herein locate intelligence for determining the specific threshold(s) to use at the aggressor rather than at the victim(s). Indeed, embodiments herein advantageously recognize that specific threshold determination at the victim(s) would prove unreliable given the unreliability of any assumption by the victim(s) about the aggressor's transmit power. Moreover, the aggressor has knowledge about its anticipated UE scheduling and transmission power, as well as UE statistics and information about the geometry/radio environment that are generally acquired over a greater coverage area (e.g., if the victims are low power nodes).

Third, the embodiments herein prove scalable whereby the aggressor can respond to requests from a larger number of victims.

Those skilled in the art will appreciate that the embodiments herein are equally applicable to RANs 12 and UEs 16 implementing any access technology and standard. Nonetheless, embodiments below are described within the context of E-UTRAN, also referred to as LTE. LTE is therefore used as just an example for understanding the problems and solutions herein and should not be seen as limiting.

Figure 4:
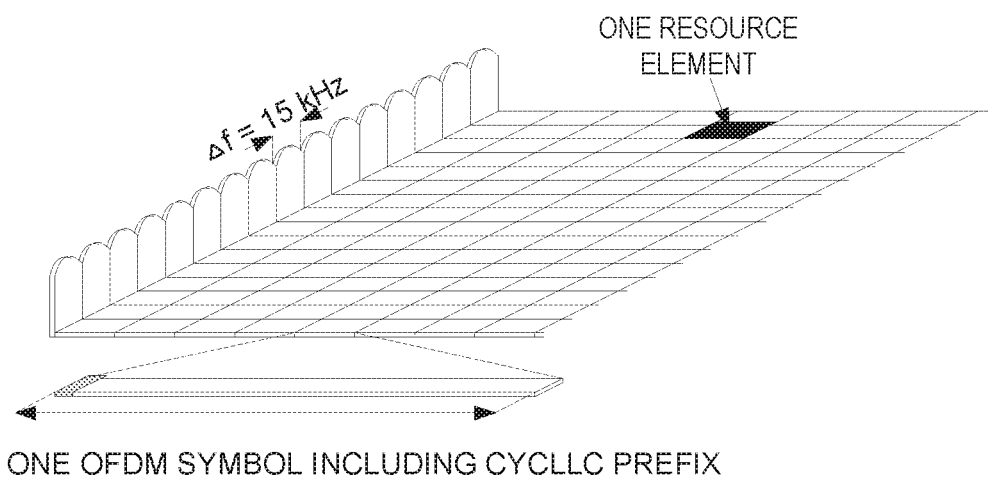
FIG. 4 is a block diagram of a time-frequency grid in Long Term Evolution (LTE) embodiments.

LTE uses OFDM in the downlink and DFT-spread OFDM in the uplink. The basic LTE downlink physical resource can thus be seen as a time-frequency grid as illustrated in FIG. 4, where each resource element corresponds to one OFDM subcarrier during one OFDM symbol interval.

Figure 5:
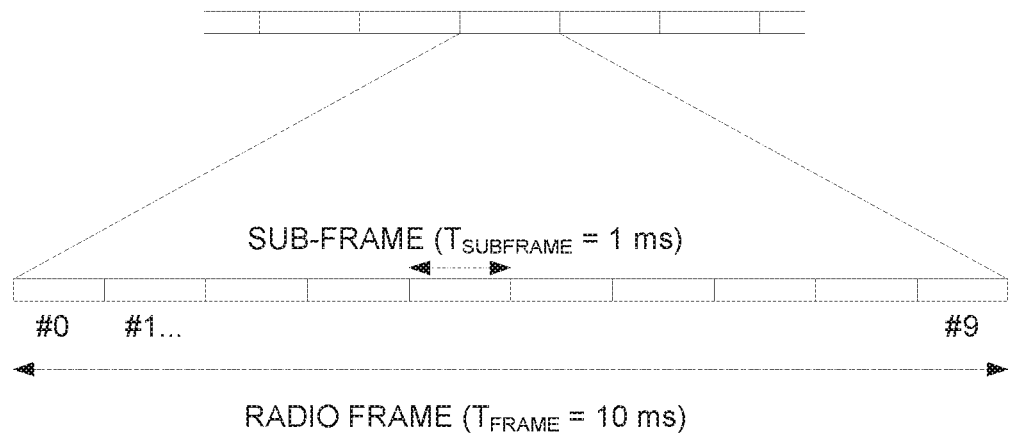
FIG. 5 is a block diagram of a frame and subframe structure in LTE embodiments.

In the time domain, LTE downlink transmissions are organized into radio frames of 10 ms, each radio frame consisting of ten equally-sized subframes of length $T_{subframe}$=1 ms. See FIG. 5.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

The notion of virtual resource blocks (VRB) and physical resource blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

Figure 6:
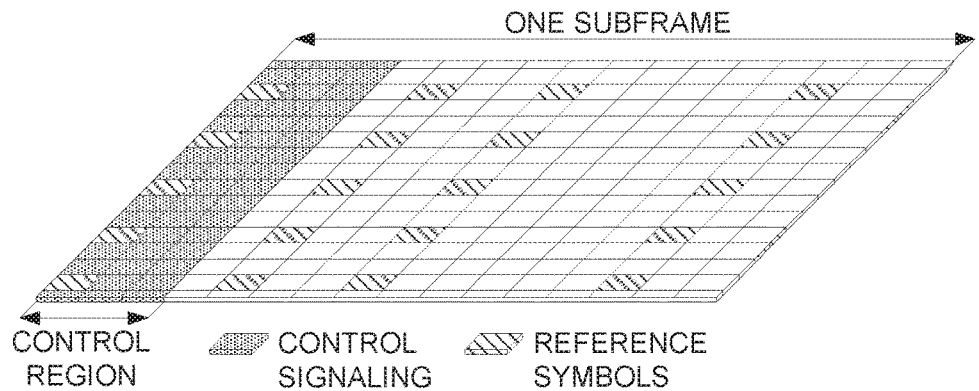
FIG. 6 is a block diagram of control signaling in LTE embodiments.

Downlink transmissions are dynamically scheduled, i.e., in each subframe the base station transmits control information about to which UEs data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols (CRS), which are known to the receiver and used for coherent demodulation of e.g. the control information. A downlink system with CFI=3 OFDM symbols as control is illustrated in FIG. 6.

Figure 7:
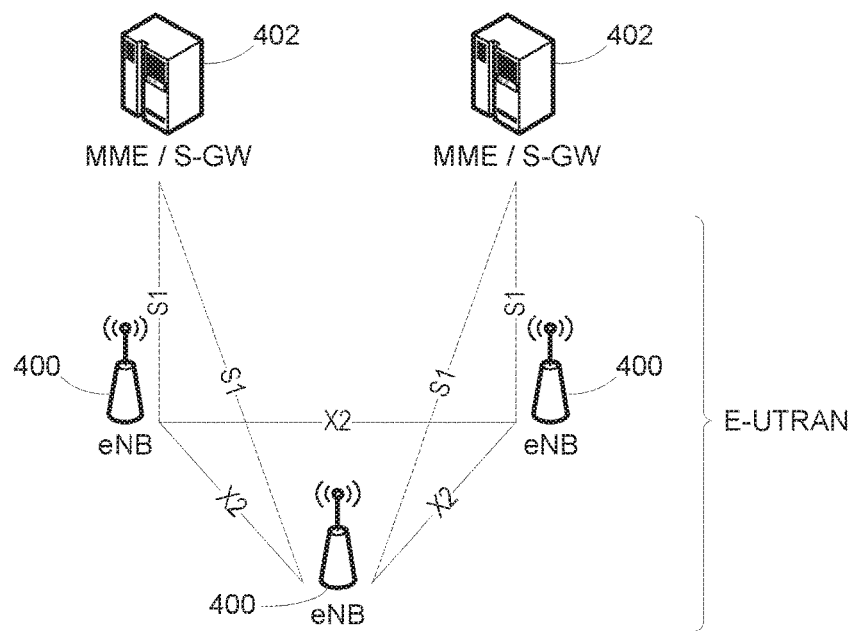
FIG. 7 is a block diagram of an LTE architecture according to one or more embodiments.

An example of LTE architecture is shown in FIG. 7. Therein, the architecture shows logical interfaces between eNBs 400 (i.e., X2 interfaces) and between eNB 400 and MME/S-GW 402 (i.e., S1 interfaces). LTE is thus based on a rather flat architecture compared to 2G and 3G systems. Each cell is served by an eNodeB or eNB ("base station"), and handovers between cells can be handled either via the Mobility Management Entity (MME) and the S1 interface, or directly between the eNBs via the X2 interface.

In embodiments wherein the radio communication network 10 is an LTE network, downlink resources 26 comprise resource blocks (RBs). Moreover, the message 28-2 sent by the aggressor 22-1 to victim 22-2 comprises a Relative Narrowband Transmit Power (RNTP) message that indicates an RNTP bitmap generated using the threshold $TH_2$ (the message may also be appropriately referred to as an RNTP report and the threshold $TH_2$ may be referred to as the RNTP threshold). In this case, the aggressor 22-1 promises to protect a given resource block 26 from interference (that is, promises not to transmit on the resource 26 with a power higher than the RNTP threshold) by setting the value of corresponding a bit in the RNTP bitmap to a value of "0." Conversely, the aggressor 22-1 refrains from making any such promise with respect to a given resource 26 by setting the value of the corresponding bit in the RNTP bitmap to a value of "1.

Upon receiving the RNTP message, the victim 22-2 schedules downlink transmissions 24 over downlink resources 26 corresponding to bits in the RNTP bitmap with a value of "0." Then, based on monitoring of interference on those resources 26, the victim 22-2 generates the feedback 30-2 to include a flag for generally requesting an increase or decrease of the RNTP threshold.

Broadly, therefore, a method for RTNP threshold negotiation between base stations is provided. A base station determines a first RNTP bitmap using a first RNTP threshold, sends a first RNTP message including the first RNTP bitmap toward another base station, receives RNTP feedback information from the another base station, determines a second RNTP threshold based on the RNTP feedback information, determines a second RNTP bitmap using the second RNTP threshold and sends a second RNTP message including the second RNTP bitmap toward the another base station. The RNTP feedback information includes a request to increase or reduce the first RNTP threshold.

Similarly, according to another embodiment, a base station receives a first RNTP message including a first RNTP bitmap which was calculated using a first RTNP threshold from another base station, sends RNTP feedback information toward the another base station, and receives a second RNTP message including a second RNTP bitmap calculated using a second RTNP threshold selected based on the RNTP feedback information from the another base station. Again, the RNTP feedback information includes a request to increase or reduce the first RNTP threshold.

Figure 8:
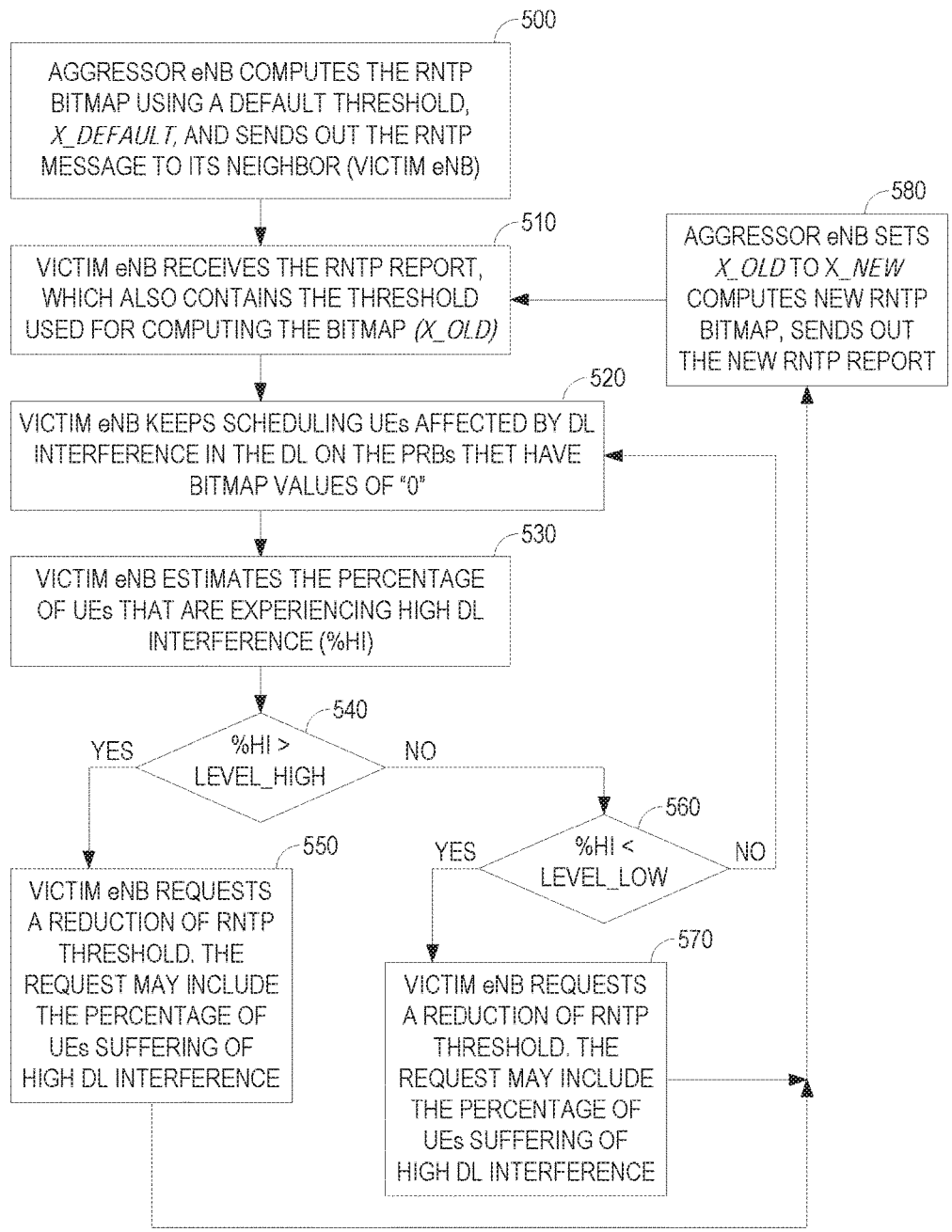
FIG. 8 is a logic flow diagram of processing performed by an aggressor eNB and a victim eNB in one or more LTE embodiments.

FIG. 8 summarizes downlink coordination according to one or more of these LTE embodiments. As shown in FIG. 8, an aggressor eNB 22-1 computes an RNTP bitmap using a default threshold x_default and sends out the RNTP message to a neighbor, victim eNB 22-2 (Block 500). The victim eNB 22-2 receives the RNTP report, which also contains the threshold used for computing the bitmap (Block 510). The threshold is x_default for the first iteration, but is generally referred to as x_old for any given iteration. The victim eNB 22-2 schedules UEs 16 affected by downlink interference (e.g., those UEs subject to high DL interference, such as UEs at cell edge) in the downlink on the PRBs that have bitmap values of "0" (at least for a certain (configurable) duration) (Block 520). The victim eNB 22-2 also estimates the percentage of UEs 16 that are experiencing high DL interference (% HI) (Block 530). If % HI is greater than a threshold Level_High (Yes at Block 540), then the victim eNB 22-2 requests a reduction of the RNTP threshold (Block 550). The request may include % HI. Alternatively, if % HI is less than a threshold Level_Low (Yes at Block 560), the victim eNB 22-2 requests a reduction of the RNTP threshold (Block 570). Again, the request may include % HI. If % HI is neither greater than Level_High nor less than Level_Low, then the victim eNB 22-2 keeps scheduling UEs 16 and repeats this process (Block 520).

Back at the aggressor eNB 22-1, the eNB 22-1 sets the threshold x_old to a new threshold x_new (determined based on the request from the victim eNB 22-2), computes a new RNTP bitmap, and sends the new RNTP report to the victim eNB 22-2 (Block 580). Downlink coordination then repeats for subsequent iterations (Block 510).

Different messages can be used as the RNTP message in LTE embodiments, in order to notify the aggressor eNB 22-1 of requested changes to the RNTP threshold. In one embodiment, a new X2 message is used for RNTP threshold change requests. This message is dedicated to RNTP Threshold negotiation, and includes an RNTP threshold Increase/Decrease Flag IE and an optional indication of the percentage of UEs that are affected by DL interference (i.e., an optional DL Interference Indication). In an alternative embodiment, an existing X2 message (e.g., an X2: LOAD INFORMATION message) or IE is used for the RNTP threshold change requests. In this case, the existing X2 message includes a new or multiple IEs indicating an RNTP threshold Increase/Decrease Flag IE and an optional indication of the percentage of UEs that are affected by DL interference.

Figure 9:
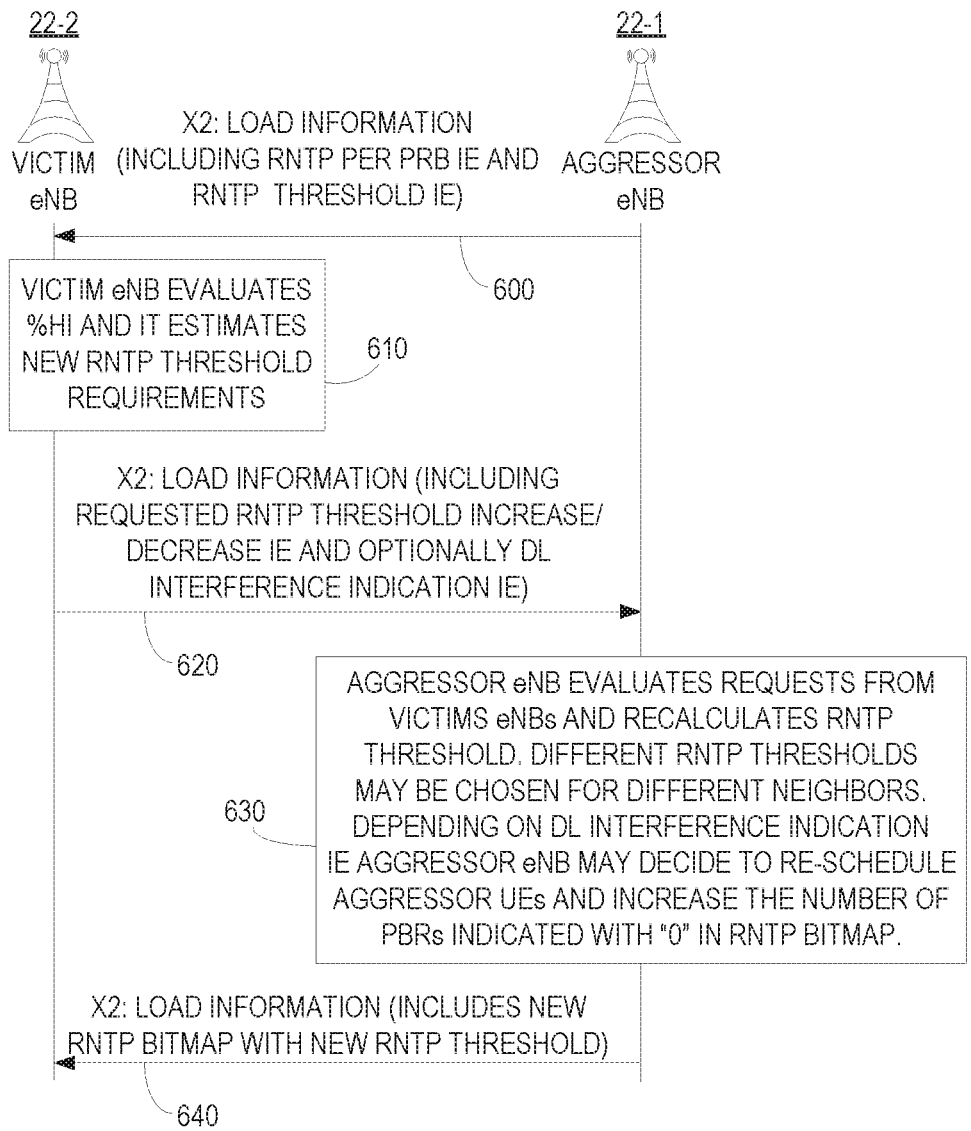
FIG. 9 is a call flow diagram of messages and feedback sent by an aggressor eNB and a victim eNB in one or more LTE embodiments.

FIG. 9 shows an example of the message sequence chart for the general structure of embodiments described above where the LOAD INFORMATION message is reused to transport new IEs. As shown in FIG. 9, the aggressor eNB 22-1 sends an X2: LOAD INFORMATION message to the victim eNB 22-2 (Step 600). The message includes an RNTP per PRB IE that indicates the RNTP bitmap, and also includes an RNTP Threshold IE that indicates the RNTP threshold. Responsive to this message, the victim eNB 22-2 evaluates % HI and estimates new RNTP threshold requirements in the sense of generally determining whether the new RNTP threshold should be increased or decreased (Step 610). The victim eNB 22-2 then generates and sends to the aggressor eNB 22-1 an X2: LOAD INFORMATION message that includes a Requested RNTP Threshold Increase/Decrease IE as feedback generally requesting an increase or decrease of the RNTP threshold (Step 620). The message, in some embodiments, also contains a DL Interference Indication IE that indicates % HI.

Based on the LOAD INFORMATION message from the victim eNB 22-2, as well as other victim eNBs, the aggressor eNB 22-1 recalculates the RNTP threshold (Step 630). In this regard, the aggressor eNB 22-1 may choose different RNTP thresholds for different victim eNBs. In some embodiments, the aggressor eNB 22-1 chooses an RNTP threshold from the set of possible threshold values specified in the 3GPP standards document "Physical Channels and Modulation" 3GPP TS 36.211, v10.4.0. Furthermore, depending on the DL Interference Indication IE, the aggressor eNB 22-1 may decide to reschedule at least some of its UEs 16 in order to increase the number of PRBs indicated with a "0" in the RNTP bitmap. Finally, the aggressor eNB 22-1 generates and sends an X2: LOAD INFORMATION message that includes the new RNTP bitmap with the new RNTP threshold (Step 640).

Irrespective of the particular wireless technology or standard employed, those skilled in the art will appreciate that downlink interference coordination as described herein is applicable to any type of network deployment. In a homogenous network, for example, a macro base station in the center of a hexagonal deployment layout will cause levels of interference to second tier neighbor macro base stations that are different than the levels of interference caused to first tier neighbor macro base stations. In this case, the center macro base station functions as the aggressor base station while the first and second tier neighbors function as the victim base stations for downlink interference coordination.

Figure 10:
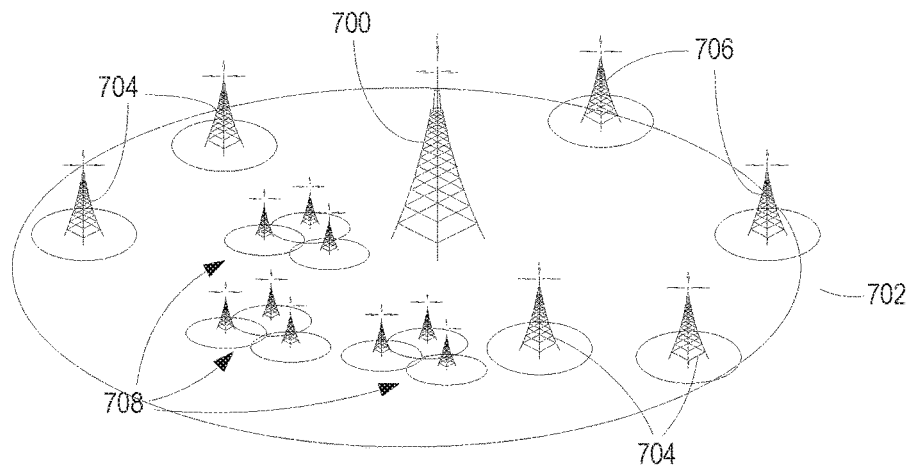
FIG. 10 is a block diagram of a heterogeneous network according to one or more embodiments.

Embodiments herein are also applicable to a heterogeneous or multilayer network. FIG. 10 illustrates one example. In particular, FIG. 10 illustrates a macro base station 700 which provides a wide area coverage (also called macro cell 702). It also shows low power nodes that are deployed to provide small area capacity/coverage. In this example, pico base stations 704, relays 706 and home base stations (femto cells 708) are shown. Although the figure shows clusters of femto cells 708, it will be appreciated by those skilled in the art that single cell home base station deployments may also exist.

Figure 11:
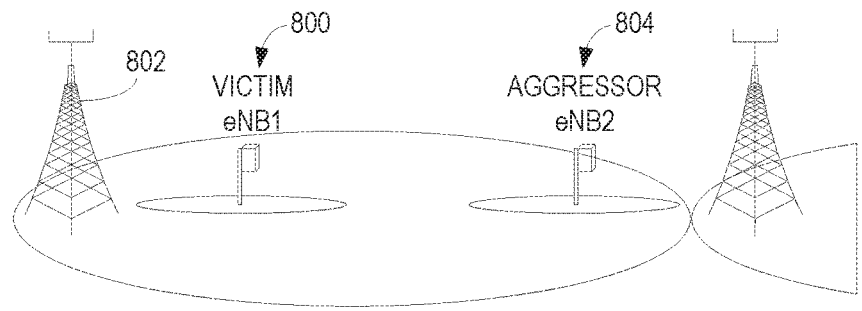
FIG. 11 is a block diagram of a macro eNB functioning as an aggressor base station and two pico eNBs functioning as victim base stations according to one or more embodiments.

In some embodiments applicable to a heterogeneous network, a macro base station functions as the aggressor base station while pico (or other non-macro) base stations function as victim base stations. Consider the scenario shown in FIG. 11. In FIG. 11, pico eNB1 800, due to its closeness to macro eNB1 802, will experience more interference from the macro eNB1 802, as compared to pico eNB2 704 (assuming co-channel deployment, which is the assumption in this description unless otherwise specified).

Assume the macro eNB1 802 sends an RNTP report to both picos 800 and 804, with a threshold value of 0. Though pico eNB2 804 can assume the PRBs marked as 0 in the RNTP bitmap to be safe to be used by its UEs, it has heretofore been dangerous for pico eNB1 800 to have the same assumption, as even a low power transmission on the PRBs from the macro eNB1 802 can lead to high interference in the UEs served by the pico 800. According to embodiments herein, though, the macro eNB1 802 functions as the aggressor base station and performs downlink interference coordination as described above with picos 800 and 804 functioning as the victim base stations.

Embodiments herein are further applicable to networks that employ different types of subframes. Consider an example. Where cells operate with different pilot power levels, there can be imbalances between uplink and downlink in the network. The reason for this is that cells are typically selected based on received signal strength, which means that UEs are served by the best downlink cell alternative. However, the uplink depends mainly on the distance between the UE and the serving site, i.e. independent of the pilot power. This means that with cell selection based on the downlink pilot, UEs may have a better uplink to a non-serving site. In such case a different solution called Cell Range Extension (CRE) is used.

Figure 12:
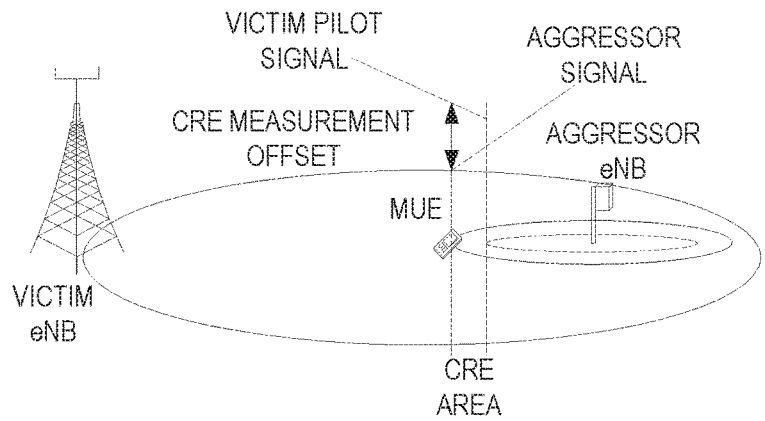
FIG. 12 illustrates an example of a network employing different subframe types according to one or more embodiments.

According to this solution the Macro UE (MUE) is configured by the Macro eNB to be able to detect cells that are further away and that normally would not be detected. Typically these cells consist of those with a pilot signal lower than 6 dBs from the pilot signal of the macro cell, although recent progress in 3GPP are focussing on the possibility of detection for pilot signals up to 9 dB lower than the serving pilot signal. The extended area within which the MUE can detect small cells with pilot signals below such threshold is called the CRE of the small cell. In order to detect neighbour cells with such pilot signals strength the MUE will need to be configured by Macro eNB with a specific measurement Offset, as shown in FIG. 12 which illustrates a CRE area and the MUE offset needed to detect a weak pico cell.

Once such cells are detected by the MUE and reported to the Macro eNB, the Macro eNB can decide to handover the MUE to the detected small cell. Such handover might be preceded by allocation of so called Almost Blank Subframes (ABS) by the Macro eNB (see TS 36.331 and TS 36.423). ABSs are "protected subframes", namely subframes where the Macro eNB limits its transmission. Therefore, a small cell neighbouring the Macro eNB will experience reduced interference on such ABS subframes.

Once the MUE is handed over to the CRE of the small cell, the small cell eNB may decide to serve the UE on ABSs, due to the otherwise high DL interference the UE would experience from the Macro eNB. Further, the UE should be configured by the small cell eNB so to measure neighbouring cells on ABSs. This will ensure that the measurements are not impacted by high levels of macro DL interference.

Reduced Power SubFrames (RPSF) may also be used. These subframes are subframes where the Macro eNB will schedule data traffic for MUEs at a reduced Tx power. The RPSF concept differs from the ABS concept in that no data traffic is supposed to be transmitted on ABS subframes, although the latter is not mandated by standardization.

The type of the subframe (e.g., normal, ABS, RPSF, MBSFN, etc.) can change from time to time, even between RNTP reports. Embodiments herein advantageously address subframe type changes without computing and communicating a new RNTP message each time the sub frame type changes, as such would be inefficient and require excessive signalling. Instead, embodiments herein send different messages for different types of subframes, where those messages indicate for which type of subframe the message is relevant. Thus, rather than being time or subframe-type agnostic, the messages are time or subframe-type specific.

In some embodiments, this subframe type differentiation is implemented together with the aforementioned threshold negotiation. In this case, the message from the aggressor 22-1 and the feedback from the victim 22-2 further indicate for which type of sub-frame the message or feedback is relevant. For example, this additional information is coded via a two big flag, where 00 means normal sub frames, 01 stands for ABS, and 10 stands for RPSF. Regardless, in at least some embodiments, threshold negotiation is performed as described above for each type of sub-frame independently.

Referring briefly back to FIG. 2A for subframe-type specific embodiments, this means that the sending (Block 100), receiving (Block 110), and determining (120) steps are performed by the aggressor 22-1 for each of the one or more iterations and for each of one or more of the different types of sub-frames (i.e., for multiple sub-frame types, there are multiple instances of FIG. 2A's processing being performed). Moreover, sending (Block 100) entails sending information indicating for which type of sub-frame the message is relevant. And receiving (Block 110) includes receiving information indicating for which type of sub-frame the feedback is relevant.

Similarly, referring to FIG. 2B for subframe-type specific embodiments, the receiving (Block 200), scheduling (Block 210), monitoring (Block 220), generating (Block 230), and sending (Block 240) is likewise performed for each of the one or more iterations and for each of one or more of the different types of sub-frames. Receiving (Block 200) comprises receiving information indicating for which type of sub-frame the message is relevant and sending (Block 240) comprises sending information indicating for which type of sub-frame the feedback is relevant.

Differentiating between subframe types in this way also advantageously informs victims about the transmission power allocated by the aggressor for such subframes. This means that the victims are able to make the best use of the subframe types, e.g., RPSF.

Figure 13:
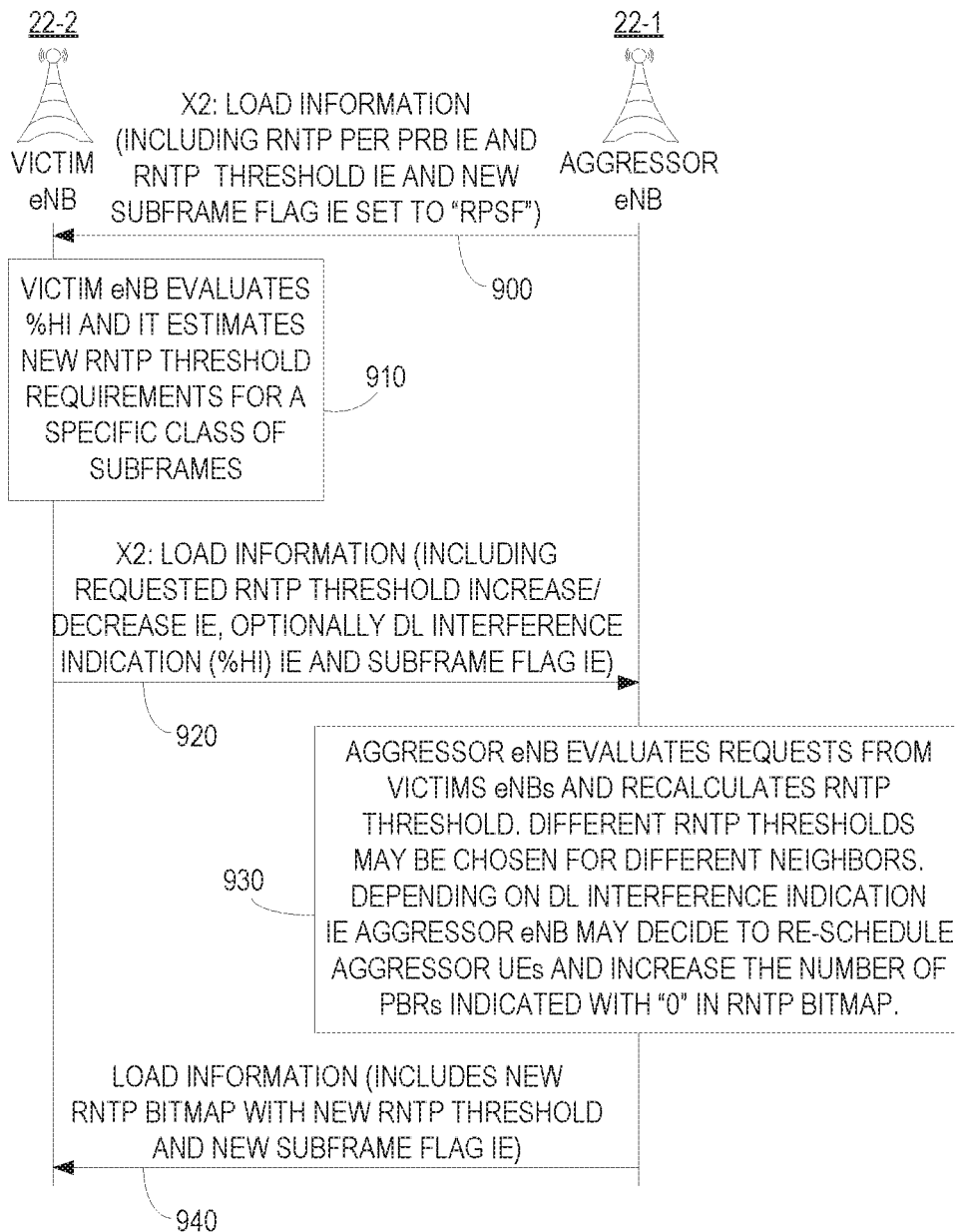
FIG. 13 is a call flow diagram of messages and feedback sent by an aggressor eNB and a victim eNB in one or more LTE embodiments where those messages and feedback indicate a type of subframe to which they are relevant.

FIG. 13 illustrates one example of these embodiments in the context of LTE and a heterogeneous network. As shown in FIG. 13, the LOAD INFORMATION message is reused to transport new IEs and to change different subframes class configurations. In particular, the LOAD INFORMATION message in step 900 contains a subframe flag set to "RPSF". This indicates that the RNTP bitmap contained in the message refers to RPSF subframes, namely the PRBs in the bitmap marked with a "0" shall be interpreted as RPSF.

Responsive to receiving the message, the pico eNB 22-2 determines whether the threshold should be increased or decreased for the specific class/type of subframe (i.e., for RPSF subframes) (Step 910). Then, in a reply message at Step 920, the Pico eNB 22-2 includes a subframe flag indicating RPSF and also indicating e.g. a reduction of the RNTP Threshold for RPSF subframes. After determining a new RNTP threshold corresponding to the maximum transmission power used in RPFS subframes (Step 930), the Macro eNB 22-1 replies at Step 940 with a LOAD INFORMATION indicating the new threshold and the Subframe Flag IE set to RPSF.

Figure 14:
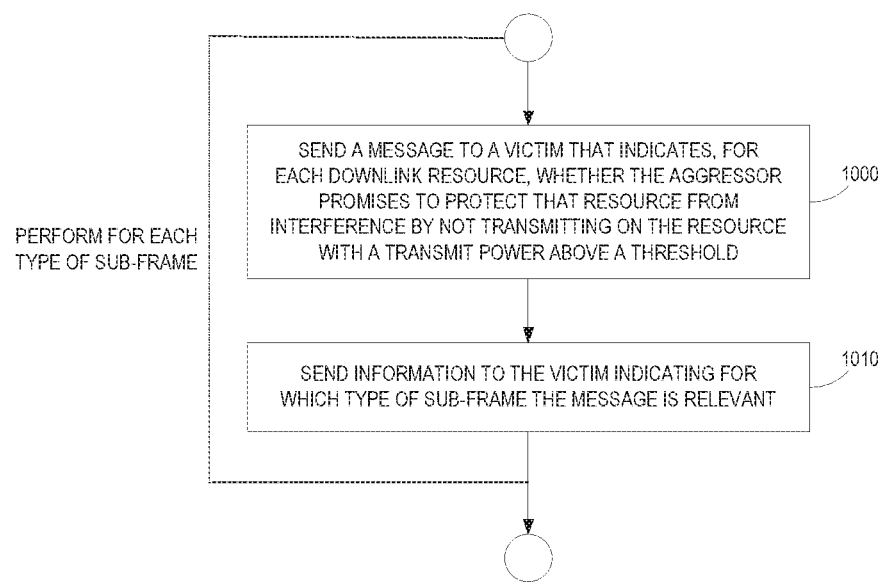
FIG. 14 is a logic flow diagram of processing performed by an aggressor base station according to one or more other embodiments.

Of course, those skilled in the art will appreciate that subframe type differentiation in other embodiments is implemented independently from the aforementioned threshold negotiation. FIG. 14 illustrates processing performed by an aggressor base station 22-1 in such embodiments. As shown, such processing is performed for each of one or more different types of sub-frames, e.g., normal sub-frames, ABSs, and/or RPSFs. Processing for a given type of sub-frame includes sending a message 28-2 to a victim base station 22-2 that indicates, for each of one or more downlink resources 26, whether the aggressor base station 22-1 promises to protect that resource 26 from interference by not transmitting on the resource 26 with a transmit power above a threshold $TH_2$ (Block 1000). Processing also notably entails sending information to the victim base station 22-2 indicating for which type of sub-frame the message 28-2 is relevant. In some embodiments, for example, this information is included in the message 28-2.

According to one or more LTE embodiments, therefore, a base station transmits an RNTP message including an RNTP bitmap and an indication of a sub-frame type for which the RNTP message is relevant. And according to a corresponding embodiment, a base station receives an RNTP message including an RNTP bitmap and an indication of a sub-frame type for which the RNTP message is relevant. The sub-frame type is one of: normal sub-frames, almost blank sub-frames and reduced power sub-frames. The base station transmits a reply requesting a change in an RNTP threshold which was used to compute the RNTP bitmap for the sub-frame type associated with the indication.

Figure 15:
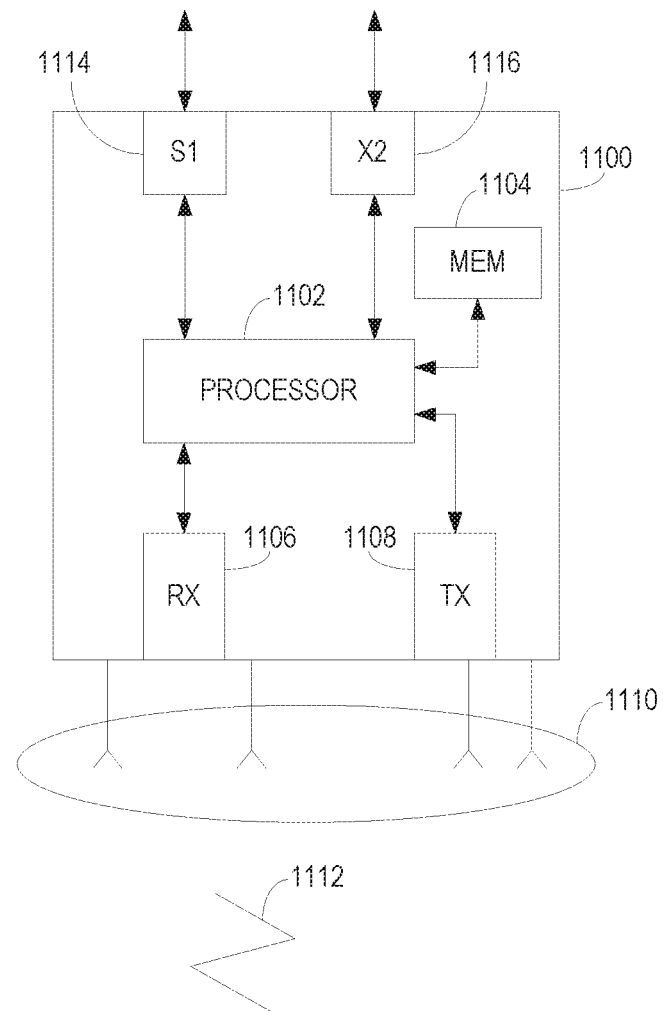
FIG. 15 is a block diagram of a base station configured according to one or more embodiments.

The various methods described herein are performed by base stations in the manner described above. A base station (e.g., an aggressor or a victim) configured to perform such methods is illustrated in FIG. 15. Therein, the base station 1100 comprises one or more receiver chains (RX) 1106 and transmit chains (TX) 1108 for receiving and transmitting radio signals, respectively, via one or more antennas 1110 over an air interface 1112. In addition to an air interface, for communicating with UEs, base station 1100 comprises other interfaces, e.g., an S1 interface 1114 and an X2 interface 1116, which interfaces can be implemented in hardware or software or some combination thereof. The X2 interface 1116 can be used as described above to transmit or receive various messages associated with RNTP threshold negotiation and/or sub-frame type differentiation The base station 110 further comprises one or more processors 1102 which control operation of other elements of the base station 1100, e.g., by running software or applications stored in one or more memory devices represented by memory unit 1104.

The method steps performed by the base station are performed by functional elements of the processing circuitry. In some embodiments these functions are carried out by appropriately programmed microprocessors or microcontrollers, alone or in conjunction with other digital hardware, which may include digital signal processors (DSPs), special-purpose digital logic, and the like. Either or both of the microprocessors and digital hardware may be configured to execute program code stored in memory. Again, because the various details and engineering tradeoffs associated with the design of baseband (and other) processing circuitry for wireless base stations are well known and are unnecessary to a full understanding of the invention, additional details are not shown here.

Program code stored in the memory circuit may comprise one or several types of memory such as read-only memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

In the description, for purposes of explanation and not limitation, specific details have been set forth such as particular architectures, interfaces, techniques, etc. in order to provide a thorough understanding of various embodiments. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The present invention may, of course, be carried out in other ways than those specifically set forth herein without departing from essential characteristics of the invention. The present embodiments are to be considered in all respects as illustrative and not restrictive.

The invention claimed is:

1. A method implemented by an aggressor base station for interference coordination with one or more victim base stations in a radio communication network, comprising:

sending a message to a victim base station that indicates whether the aggressor base station promises to protect a radio resource from interference by not transmitting on the radio resource with a transmit power above a threshold; and adjusting the threshold above which the aggressor base station promises not to transmit on the radio resource, based on information received from the victim base station indicating interference on the radio resource experienced by one or more user equipments served by the victim base station.

2. The method of claim 1, wherein the information received from the victim base station indicates a number or percentage of user equipments served by the victim base station that are experiencing interference on the radio resource above a defined interference level.

3. The method of claim 1, wherein the radio communication network is a Long Term Evolution network, wherein a radio resource comprises a resource block, and wherein the message comprises a Relative Narrowband Transmit Power (RNTP) message that indicates an RNTP bitmap.

4. The method of claim 1, further comprising adjusting the number of radio resources that the aggressor base station promises to protect, based on the information received from the victim base station.

5. The method of claim 1, further comprising adjusting the transmit power with which the aggressor base station transmits on the radio resource, based on the information received from the victim base station.

6. The method of claim 1, wherein the aggressor base station is configured to transmit different types of sub-frames, and wherein said sending and adjusting is performed for each of one or more of the different types of sub-frames, wherein said sending further comprises sending information indicating for which type of sub-frame the message is relevant and wherein the information received from the victim base station indicates for which type of sub-frame that information is relevant.

7. The method of claim 1, further comprising sending another message to the victim base station that indicates whether the aggressor base station promises to protect the radio resource from interference by not transmitting on the radio resource with a transmit power above the adjusted threshold.

8. A method implemented by a victim base station for interference coordination with an aggressor base station in a radio communication network, comprising:

receiving a message from the aggressor base station that indicates whether the aggressor base station promises to protect a radio resource from interference by not transmitting on the radio resource with a transmit power higher than a threshold;

scheduling a transmission to a user equipment on the radio resource;

monitoring for interference to the transmission;

based on said monitoring, generating information that indicates interference on the radio resource experienced by the user equipment; and sending the information to the aggressor base station.

9. The method of claim 8, wherein the information indicates a number or percentage of user equipments served by the victim base station that are experiencing interference on the radio resource above a defined interference level.

10. The method of claim 9, wherein said sending comprises sending the information more frequently the higher said number or percentage of said UEs is above a first defined level or the lower said number or percentage of said UEs is below a second defined level.

11. The method of claim 8, wherein the radio communication network is a Long Term Evolution network, wherein a radio resource comprises a resource block, and wherein the message comprises a Relative Narrowband Transmit Power (RNTP) message that indicates an RNTP bitmap.

12. An aggressor base station configured for interference coordination with one or more victim base stations in a radio communication network, comprising:
    communication circuitry; and
    processing circuitry configured to:
        send, via the communication circuitry, a message to a victim base station that indicates whether the aggressor base station promises to protect a radio resource from interference by not transmitting on the radio resource with a transmit power above a threshold; and
        adjust the threshold above which the aggressor base station promises not to transmit on the radio resource, based on information received from the victim base station indicating interference on the radio resource experienced by one or more user equipments served by the victim base station.

13. The aggressor base station of claim 12, wherein the information received from the victim base station indicates a number or percentage of user equipments served by the victim base station that are experiencing interference on the radio resource above a defined interference level.

14. The aggressor base station of claim 12, wherein the radio communication network is a Long Term Evolution network, wherein a radio resource comprises a resource block, and wherein the message comprises a Relative Narrowband Transmit Power (RNTP) message that indicates an RNTP bitmap.

15. The aggressor base station of claim 12, wherein the processing circuitry is configured to adjust the number of radio resources that the aggressor base station promises to protect, based on the information received from the victim base station.

16. The aggressor base station of claim 12, wherein the processing circuitry is configured to adjust the transmit power with which the aggressor base station transmits on the radio resource, based on the information received from the victim base station.

17. The aggressor base station of claim 12, wherein the aggressor base station is configured to transmit different types of sub-frames, and wherein the processing circuitry is configured to send the message and adjust the threshold for each of one or more of the different types of sub-frames, wherein the processing circuitry is configured to send information indicating for which type of sub-frame the message is relevant and wherein the information received from the victim base station indicates for which type of sub-frame that information is relevant.

18. The aggressor base station of claim 12, wherein the processing circuitry is configured to send another message to the victim base station that indicates whether the aggressor base station promises to protect the radio resource from interference by not transmitting on the radio resource with a transmit power above the adjusted threshold.

19. A victim base station configured for interference coordination with an aggressor base station in a radio communication network, comprising:
    communication circuitry; and
    processing circuitry configured to:
        receive, via the communication circuitry, a message from the aggressor base station that indicates whether the aggressor base station promises to protect a radio resource from interference by not transmitting on the radio resource with a transmit power higher than a threshold;
        schedule a transmission to a user equipment on the radio resource;
        monitor for interference to the transmission;
        based on said monitoring, generate information that indicates interference on the radio resource experienced by the user equipment; and
        send, via the communication circuitry, the information to the aggressor base station.

20. The victim base station of claim 19, wherein the information indicates a number or percentage of user equipments served by the victim base station that are experiencing interference on the radio resource above a defined interference level.

21. The victim base station of claim 20, wherein the processing circuitry is configured to send the information more frequently the higher said number or percentage of said UEs is above a first defined level or the lower said number or percentage of said UEs is below a second defined level.

22. The victim base station of claim 19, wherein the radio communication network is a Long Term Evolution network, wherein a radio resource comprises a resource block, and wherein the message comprises a Relative Narrowband Transmit Power (RNTP) message that indicates an RNTP bitmap.

* * * * *